United States Patent [19]

Kolchinsky

[11] Patent Number: 4,790,345
[45] Date of Patent: Dec. 13, 1988

[54] PROPORTIONAL VALVE

[75] Inventor: Abel E. Kolchinsky, Glenview, Ill.

[73] Assignee: Parker-Hannifin Corporation, Cleveland, Ohio

[21] Appl. No.: 157,207

[22] Filed: Feb. 17, 1988

Related U.S. Application Data

[63] Continuation of Ser. No. 026,825, Mar. 17, 1987, abandoned.

[51] Int. Cl.$^4$ .............................................. F16K 31/06
[52] U.S. Cl. .................................. 137/269; 335/262; 251/129.15; 251/129.08; 251/129.18; 251/368
[58] Field of Search ...................... 335/262; 251/129.1, 251/129.08, 129.18, 129.15, 368; 137/269

[56] References Cited

U.S. PATENT DOCUMENTS

| | | | |
|---|---|---|---|
| 3,215,902 | 11/1965 | Foley et al. ................ | 251/129.15 X |
| 3,510,814 | 5/1970 | Nordfors .................... | 251/129.15 X |
| 3,684,238 | 8/1972 | Michellone et al. ....... | 251/129.08 X |
| 4,004,343 | 1/1977 | Marsden .................... | 335/262 X |
| 4,074,700 | 2/1978 | Engle ......................... | 251/129.15 X |
| 4,108,420 | 8/1978 | West et al. ................. | 251/129.08 X |

Primary Examiner—Arnold Rosenthal

[57] ABSTRACT

A fluid flow control proportional valve having structure for providing mounting therein of any one of a plurality of different solenoid coils having different electromechanical characteristics for providing desired positioning of the movable valve thereof. The solenoid armature is slidably mounted within the solenoid tube by structure providing extremely low friction so as to provide improved accuracy in correspondence between the current flow through the solenoid coil and resulting positioning of the spool assembly of the valve. The structure for mounting the armature in the solenoid tube further defines a seal between the armature and solenoid tube.

15 Claims, 1 Drawing Sheet

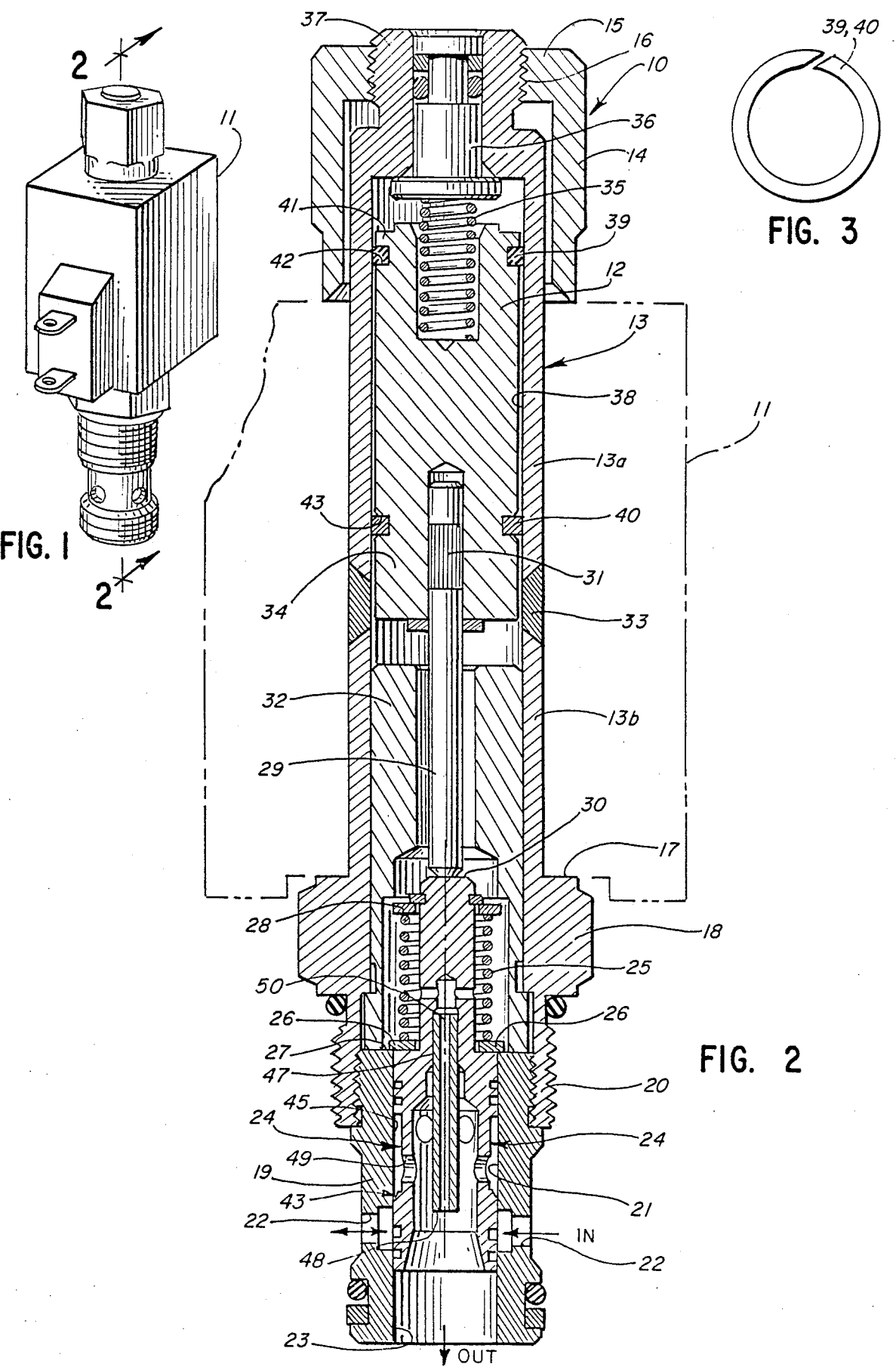

PROPORTIONAL VALVE

This is a continuation of application Ser. No. 07/026,825 filed Mar. 17, 1987, now abandoned.

TECHNICAL FIELD

This invention relates to fluid flow control valves and in particular to a solenoid-operated proportional valve.

BACKGROUND ART

In U.S. Pat. No. 4,540,154 of Abel E. Kolchinsky et al, which patent is owned by the assignee hereof, a fluid flow control valve is disclosed having an improved solenoid structure for selectively positioning the valve member. As shown therein, the solenoid structure includes a solenoid coil retained in association with a solenoid tube by means of a distal nut threadedly secured to the distal end of a closure element fixedly secured to the end of the solenoid tube. The plunger armature is slidably received within the inner end of the tube for selective positioning as an incident of selective energization of the solenoid coil. The closure is secured to the tube by brazing.

DISCLOSURE OF INVENTION

The present invention comprehends a further improved solenoid valve providing for facilitated selective positioning of the valve to provide accurately controlled variable flow.

More specifically, the invention comprehends the provision of such a solenoid valve having improved means for selectively utilizing any one of a plurality of different solenoid coils for providing different electromagnetic force acting on the solenoid plunger, or armature, against the action of a return spring so as to provide selective flow control.

The invention comprehends providing, in such a solenoid valve structure, improved means for effectively minimizing friction, between the solenoid armature and guide tube in which it is mounted for improved accuracy in the positioning of the valve member and providing the desired flow control.

The provision of improved slidable mounting means acting between the solenoid armature and solenoid tube provides for improved accuracy of positioning of the valve member in accordance with the selected solenoid coil.

The invention further comprehends the adjustment of the solenoid coil current to provide adjustable positioning of the valve member, with the low friction mounting of the solenoid armature providing for accurate correspondence of the valve positioning to the adjusted current for providing improved accuracy in the control of the fluid flow.

More specifically, the invention comprehends providing in a proportional fluid flow control valve having a valve body defining a flow chamber having an inlet and an outlet, and a movable valve member in the chamber for adjustably controlling fluid flow therethrough, of an improved means for adjustably positioning the valve member including a solenoid tube having one end sealingly secured to the valve body in connection with the chamber and an opposite end, a solenoid armature movably disposed within the tube, means responsive to positioning of the armature for correspondingly positioning the valve member, an annular solenoid coil concentrically surrounding the solenoid tube for controlledly positioning the armature, securing means for selectively (a) fixedly retaining the coil at a preselected position longitudinally of the tube, and (b) permitting longitudinal movement of the coil past the opposite end of the solenoid tube for selective installation and removal of the coil relative to the control valve as desired, and means for slidingly supporting the armature in the solenoid tube adjacent opposite ends of the armature, the solenoid coil comprising any one of a plurality of different coils providing correspondingly different positionings of the valve member when mounted concentrically surrounding the solenoid tube, and means for providing accurate positioning of the solenoid armature as a result of energization of the solenoid coil comprising means for slidably supporting the solenoid armature coaxiallly centered within the solenoid tube including means defining a low friction radially inner surface on the solenoid tube and longitudinally spaced annular slides concentrically mounted to the solenoid armature.

In the illustrated embodiment, the securing means comprises an annular locking element threadedly secured to a distal end of the solenoid tube.

In the illustrated embodiment, the means slidably supporting the solenoid armature within the solenoid tube comprises annular sealing rings formed of low friction synthetic resin.

In the illustrated embodiment, the sealing rings are located adjacent the opposite ends of the solenoid armature.

The invention comprehends providing the radially inner surface of the solenoid tube as a low friction surface cooperating with the low friction sealing rings to define a low friction slidable mounting of the solenoid armature within the solenoid tube.

The proportional fluid flow control valve of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein FIG. 1 is a perspective view of a fluid flow control valve embodying the invention;

FIG. 2 is a fragmentary diametric section thereof taken substantially along the line 2—2 of FIG. 1; and FIG. 3 is an elevation illustrating a seal ring as used in the fluid flow control valve of the invention.

BEST MODE FOR CARRYING OUT THE INVENTION

In the illustrative embodiment of the invention as disclosed in the drawing, a fluid flow proportional valve generally designated 10 is shown to comprise a two-way, normally closed proportional valve provided with an encapsulated solenoid coil 11 which may comprise any one of a plurality of different solenoid coils having different current ratings to provide correspondingly different displacement forces acting on the solenoid plunger, or armature, 12 received within the solenoid tube 13.

Coil 11 is removably mounted in concentrically surrounding relationship to tube 13, as shown in FIG. 2, and is retained in a preselected disposition longitudinally of tube 13 by means of a tubular nut 14 having a distal end 15 threadedly secured to an externally threaded portion 16 defining the distal end of the tube 13. Nut 14 urges the solenoid coil against an annular shoulder 17 defined by an annular collar 18 of the solenoid tube.

As shown in FIG. 2, the solenoid tube includes an outer portion 13a and an inner portion 13b, collar 18 being provided on the inner portion.

A valve sleeve 19 is threadedly secured to the distal end 20 of the tube portion 13b and defines a valve chamber 21 having an inlet portion 22 and an outlet port 23. A valve spool assembly generally designated 24 is slidably mounted in the valve chamber for selectively controlling flow of fluid from inlet 22 to the outlet 23.

Spool assembly 24 is biased to the normally closed position of FIG. 2 by a coil spring 25 acting between an annular stop washer 26 abutting an annular end surface 27 of sleeve 19, and an annular flange 28 on the upper end of the spool assembly 24.

Spool assembly 24 is displaced in opposition to the positioning of spring 25 by a pin 29 engaging an end surface 30 of the spool assembly, and having its distal end 31 fixedly secured to the armature 12. The pin 29 extends coaxially through a tubular stop 32 fixedly retained within the tube portion 13b.

As shown in FIG. 2, the tube portions 13a and 13b of solenoid tube 13 are separated by a nonmagnetic spacer ring 33, the tube portions 13a and 13b being formed of a suitable magnetic material, such as steel.

Armature 12 is coaxially received within tube portion 13a, with a lower distal portion 34 disposed radially inwardly of spacer 33 in the normally closed, de-energized arrangement of the valve shown in FIG. 2. Energization of the solenoid coil 11 produces an electromagnetic force on the armature so as to urge the armature downwardly to bring the lower end portion 34 to within the lower tube portion 13b and concurrently cause pin 29 to urge the spool assembly 24 downwardly to an open position providing communication between inlet ports 22 and outlet port 23. As further shown in FIG. 2, armature 12 is biased downwardly by a coil spring 35 acting between the armature and a plug 36 mounted in the distal end 37 of the solenoid tube portion 13a.

Armature 12 is coaxially movable within the solenoid tube and is slidably supported on the inner surface 38 of the solenoid tube by a pair of slide rings 39 and 40 mounted to the armature at the opposite ends 41 and 34 thereof. As shown in FIG. 3, the slide rings comprise split rings. The rings are mounted in annular, radially outwardly opening recesses 42 and 43 provided in the armature so as to extend radially outwardly therefrom into slidable engagement with the solenoid tube inner surface 38.

Rings 39 and 40 are preferably formed of a low friction material, such as polytetrafluoroethylene, and the inner surface 38 of the solenoid tube is preferably caused to have a low friction characteristic, such as by polishing, so as to effectively minimize frictional forces between the slide rings and the solenoid tube surface.

The finish of the surface 38 is preferably not less than 8 RMS, i.e. substantially a mirror finish, so as to provide the desired low friction support of the armature. As a result of the low friction support, hysteresis as between movement in the opening and closing directions is effectively minimized. Resultingly, improved accuracy in the positioning of the valve 24 may be effected. Similarly, control of the displacement of the armature by selective control of the current passed through the solenoid coil 11 provides accurately corresponding positioning of the armature, and valve 24.

Further, as discussed briefly above, the provision of the nut in threaded association with the distal end of the solenoid tube portion 13a permits ready interchangeability so that any one of a plurality of different solenoid coils having different electromechanical characteristics may be utilized in providing the desired flow control. Thus, it is unnecessary to substitute different springs 25 to provide the desired selective positioning of the spool assembly 24 in the energized condition of the solenoid valve.

The proportional valve of the present invention is extremely simple and economical of construction, while yet providing the highly desirable features discussed above.

The foregoing disclosure of specific embodiments is illustrative of the broad inventive concepts comprehended by the invention.

I claim:

1. In a proportional fluid flow control valve having a valve body defining a flow chamber having an inlet and an outlet, a movable valve member in said chamber for adjustably controlling fluid flow through said valve chamber between said inlet and outlet, improved means for adjustably positioning said valve member, comprising:

a solenoid tube having one end sealingly secured to said valve body in communication with said chamber and an opposite end;

a solenoid armature movably disposed within said tube;

means responsive to positioning of said armature for correspondingly positioning said valve member;

an annular solenoid coil concentrically surrounding said solenoid tube for controlledly positioning said armature;

securing means for selectively (a) fixedly retaining said coil at a preselected position longitudinally of said tube, and (b) permitting longitudinal movement of said coil past said opposite end of the solenoid tube for selective installation and removal of said coil relative to said control valve as desired;

means for slidably supporting the armature in said said solenoid tube adjacent opposite ends of said armature, said solenoid coil comprising any one of a plurality of different coils providing correspondingly different positionings of said valve member when mounted concentrically surrounding said solenoid tube; and means for providing accurate positioning of said solenoid armature as a result of energization of said solenoid coil comprising means for slidably supporting said solenoid armature coaxially centered within said solenoid tube including means defining a low friction radially inner mirror finish surface on said solenoid tube and longitudinally spaced annular slides concentrically mounted to said solenoid armature having annular sliding engagement with said solenoid tube inner surface.

2. The proportional fluid flow control valve of claim 1 wherein said means for positioning said valve member includes spring means opposing positioning of said solenoid armature by said solenoid coil, whereby positioning of said valve member is determined by the relative strength of the opposed solenoid coil and spring means forces substantially free of frictional forces acting between said solenoid armature and said solenoid tube.

3. The proportional fluid flow control valve of claim 1 wherein said annular slides are formed of a synthetic resin having low friction surface characteristics.

4. The proportional fluid flow control valve of claim 1 wherein said securing means comprises an annular locking element threadedly secured to said solenoid tube opposite end.

5. The proportional fluid flow control valve of claim 1 wherein said annular slides define right-circularly cylindrical, radially outer surfaces slidably engaging said radially inner surface of the solenoid tube.

6. In a proportional fluid flow control valve having a valve body defining a flow chamber having an inlet and an outlet, a movable valve member in said chamber for adjustably controlling fluid flow through said valve chamber between said inlet and outlet, improved means for adjustably positioning said valve member, comprising:

a solenoid tube having one end sealingly secured to said valve body in communication with said chamber and an opposite end;

a solenoid armature movably disposed within said tube;

means responsive to positioning of said armature for correspondingly positioning said valve member;

an annular solenoid coil concentrically surrounding said solenoid tube for controlledly positioning said armature; and means for providing accurate positioning of said solenoid armature as a result of energization of said solenoid coil comprising means for slidably supporting said solenoid armature coaxially centered within said solenoid tube including means defining a low friction radially inner mirror finish surface on said solenoid tube and longitudinally spaced annular slides concentrically mounted to said solenoid armature having annular sliding engagement with said solenoid tube inner surface.

7. The proportional fluid flow control valve of claim 6 wherein said annular slides comprise split rings.

8. The proportional fluid flow control valve of claim 6 wherein said annular slides are formed of a synthetic resins having low friction surface characteristics.

9. The proportional fluid flow control valve of claim 6 wherein said annular slides are formed of polytetrafluoroethylene resin.

10. In a proportional fluid flow control valve having a valve body defining a flow chamber having an inlet and an outlet, a movable valve member in said chamber for adjustably controlling fluid flow through said valve chamber between said inlet and outlet, improved means for adjustably positioning said valve member, comprising:

a solenoid tube having one end sealingly secured to said valve body in communication with said chamber and an opposite end;

a solenoid armature movably disposed within said tube;

means responsive to positioning of said armature for correspondingly positioning said valve member;

an annular solenoid coil concentrically surrounding said solenoid tube for controlledly positioning said armature;

securing means for selectively (a) fixedly retaining said coil at a preselected position longitudinally of said tube, and (b) permitting longitudinal movement of said coil past said opposite end of the solenoid tube for selective installation and removal of said coil relative to said control valve as desired; and low friction means on said armature for slidably supporting the armature accurately coaxially in said solenoid tube adjacent opposite ends of said armature, said solenoid tube defining an inner surface having a mirror surface slidably engaged by said low friction means.

11. The proportional fluid flow control valve of claim 10 wherein said securing means comprises an annular locking element threadedly secured to said solenoid tube opposite end.

12. The proportional fluid flow control valve of claim 10 wherein said securing means comprises an annular locking element threadedly secured to said solenoid tube opposite end and shoulder means on said solenoid tube one end.

13. The proportional fluid flow control valve of claim 10 wherein said solenoid coil defines longitudinally opposite end surfaces, and said securing means comprises means engaging said end surfaces.

14. The proportional fluid flow control valve of claim 10 wherein said solenoid coil defines longitudinally opposite end surfaces, and said securing means comprises means clampedly engaging said end surfaces.

15. The proportional fluid flow control valve of claim 10 wherein said securing means comprises means for applying a longitudinally acting compressive force to said solenoid coils.

* * * * *